United States Patent
Park

(10) Patent No.: US 9,043,630 B2
(45) Date of Patent: May 26, 2015

(54) IMAGE FORMING APPARATUS, SYSTEM-ON-CHIP (SOC) UNIT, AND DRIVING METHOD THEREOF

(75) Inventor: Ho-beom Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 514 days.

(21) Appl. No.: 13/069,596

(22) Filed: Mar. 23, 2011

(65) Prior Publication Data

US 2012/0054479 A1 Mar. 1, 2012

(30) Foreign Application Priority Data

Aug. 27, 2010 (KR) .................. 10-2010-0083540

(51) Int. Cl.
*G06F 1/32* (2006.01)
*G06F 3/12* (2006.01)

(52) U.S. Cl.
CPC ............ *G06F 1/3203* (2013.01); *G06F 1/3284* (2013.01); *G06F 1/3287* (2013.01); *G06F 3/1221* (2013.01); *G06F 3/1229* (2013.01); *Y02B 60/1282* (2013.01); *Y02B 60/1267* (2013.01); *Y02B 60/1271* (2013.01); *Y02B 60/32* (2013.01)

(58) Field of Classification Search
None
See application file for complete search history.

(56) References Cited

U.S. PATENT DOCUMENTS

| 7,437,577 | B2 | 10/2008 | Obara et al. | |
|---|---|---|---|---|
| 2006/0020891 | A1 | 1/2006 | Obara et al. | |
| 2007/0240004 | A1* | 10/2007 | Maeda | 713/322 |
| 2008/0028243 | A1* | 1/2008 | Morisawa | 713/323 |
| 2009/0204837 | A1* | 8/2009 | Raval et al. | 713/330 |
| 2009/0207423 | A1 | 8/2009 | Shimizu et al. | |
| 2010/0205467 | A1 | 8/2010 | Park | |
| 2010/0250987 | A1* | 9/2010 | Furukawa | 713/323 |
| 2011/0078463 | A1* | 3/2011 | Fleming et al. | 713/300 |

FOREIGN PATENT DOCUMENTS

| EP | 1035499 | 9/2000 |
|---|---|---|
| JP | 2006-31625 | 2/2006 |
| WO | 2009/140758 | 11/2009 |

OTHER PUBLICATIONS

Extended European Search Report issued on Oct. 5, 2012 in EP Application No. 11178100.1.

* cited by examiner

*Primary Examiner* — Paul Yanchus, III
(74) *Attorney, Agent, or Firm* — Staas & Halsey LLP

(57) ABSTRACT

An image forming apparatus is connected to a host device including first and second power domains which are separately supplied with power and includes first and second memories to be disposed in the second power domain, a main controller disposed in the first power domain and to perform a control operation using the first memory in a normal mode, and a sub-controller disposed in the second power domain and perform a control operation using the second memory in a power-saving mode, where when the normal mode is changed to the power-saving mode a power supply to the first power domain is shut off, the first memory operates in a self-refresh mode, and the main controller copies central processing unit (CPU) context information into a context storage unit, and when the power-saving mode is changed to the normal mode, the main controller is booted using the CPU context information stored in the context storage unit.

18 Claims, 7 Drawing Sheets

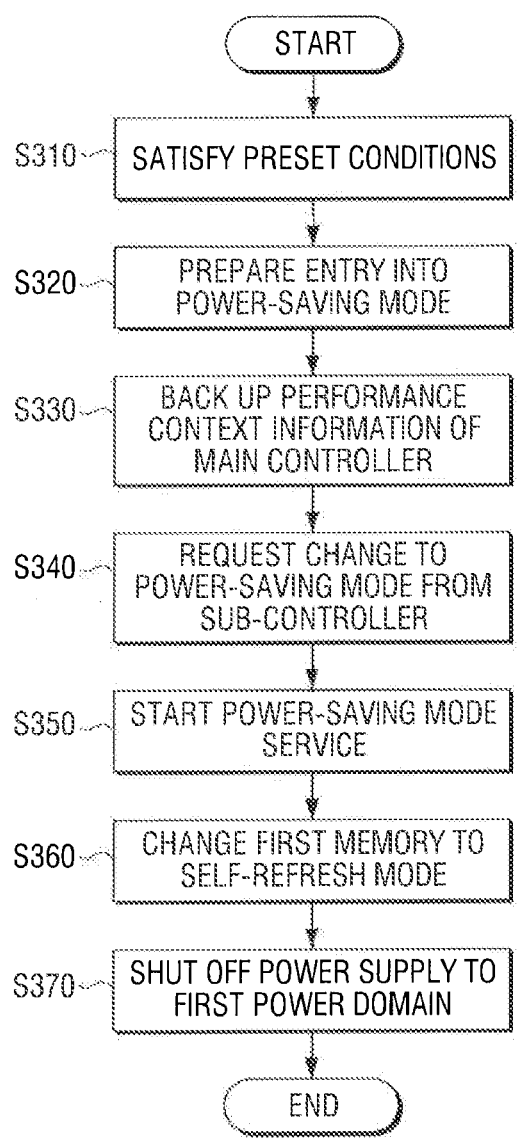

IMAGE FORMING APPARATUS, SYSTEM-ON-CHIP (SOC) UNIT, AND DRIVING METHOD THEREOF

CROSS-REFERENCE TO RELATED APPLICATIONS

This application claims the benefit under 35 U.S.C. §119 from Korean Patent Application No. 10-2010-0083540, filed on Aug. 27, 2010, in the Korean Intellectual Property Office, the disclosure of which is incorporated herein by reference in its entirety.

BACKGROUND

1. Field of the Invention

The present general inventive concept generally relates to an image forming apparatus, a system-on-chip (SoC) unit, and a driving method thereof, and more particularly, to an image forming apparatus having a power-saving mode, an SoC unit, and a driving method thereof.

2. Description of the Related Art

Demands for low power of all electronic products have been gradually reinforced. If there are no actions against these demands, it will be impossible to sell electronic products due to the regulations in spite of their strong points of performances and prices.

Current specs of Energy Star require power consumption less than or equal to a range between 1 W and 2 W in a wait mode according to the types of devices. Power consumption of 1 W or less will be required even in a wait mode in which a network service is possible. In order to achieve this, all electronic companies utilize several methods.

Also, a device must not inconvenience a consumer depending on whether the device is in a low power mode or a normal operation mode.

In order to achieve a low power wait mode, most companies utilize a method of providing a service through a high-performance main central processing unit (CPU) in a normal mode, switching off unnecessary power of the high-performance main CPU and a system through a low power auxiliary CPU when the system goes into a wait mode under a specific condition, monitoring a service request through the low power auxiliary CPU, and when a user requests a service, applying power to the high-performance main CPU and auxiliary circuits to provide the service to the user.

For example, a conventional system uses a method of allocating power supply lines to first and second power domains, respectively, to manage a power source and then shutting off a power supply to the first power domain which does not need to operate in a low power mode service.

Therefore, if a condition of a change from a normal mode to a low power mode is satisfied, the conventional system performs a change to the low power mode, shuts off a power supply to the first power domain through a sub-controller, and goes into the low power mode.

In the conventional system, a main controller and a dynamic random access memory (DRAM) are turned off when the first domain is turned off. Thus, all data of the DRAM is lost, and the main controller is rebooted. Therefore, since a process of going from a power-saving mode into a normal mode according to a service request is performed equal to an initial system booting process, 10 seconds or more are required in conventional systems.

If a network link is gone out for 15 seconds or more after a printer requests printing from a network, an error message is displayed to a user.

If a multifunction peripheral does not respond to a button click of a panel, which is performed for a scan operation, within several seconds, a consumer doubts a performance of the multifunction peripheral in spite of the achievement of low power.

SUMMARY

The present general inventive concept provides an image forming apparatus which can shorten a rebooting time in a power-saving mode, a system-on-chip (SoC) unit, and a driving method.

Additional embodiments of the present general inventive concept will be set forth in part in the description which follows and, in part, will be obvious from the description, or may be learned by practice of the general inventive concept.

Exemplary embodiments of the present general inventive concept may provide an image forming apparatus which is connected to a host device having first and second power domains which are separately supplied with power through different power supply lines, including first and second memories disposed in the second power domain, a main controller disposed in the first power domain to perform a control operation using the first memory in a normal mode, a sub-controller disposed in the second power domain to perform a control operation using the second memory in a power-saving mode; and a context storage unit to store context information, wherein a power supply to the first power domain is shut off when the normal mode is changed to the power-saving mode, the first memory operates in a self-refresh mode when the normal mode is changed to the power-saving mode, and the main controller copies central processing unit (CPU) context information, which is lost when shutting off the power supply to the first power domain, into the context storage unit when the normal mode is changed to the power-saving mode, and the main controller is booted using the CPU context information stored in the context storage unit when the power-saving mode is changed to the normal mode.

The image forming apparatus may further include a power supply unit to supply power to the first and second power domains, and a process controller to control the power supply unit to shut off the power supply to the first power domain when the normal mode is changed to the power-saving mode.

The image forming apparatus may further include a data receiver to receive image data from the outside, a data processor to process the received image data, and an engine unit to perform an image forming job with the processed image data, where the engine unit and the data processor are disposed in the first power domain, and the data receiver is disposed in the second power domain.

When the normal mode is changed to the power-saving mode, the main controller may copy CPU context information, which is lost when shutting off the power supply to the first power domain, and context information of elements of the first power domain into the context storage unit.

The image forming apparatus may further include when a booting operation is performed, a booting mode determiner to determine whether the booting operation is performed in the normal mode or whether a re-booting operation is performed in the power-saving mode, wherein when the booting operation is the re-booting operation performed in the power-saving mode, the main controller is booted using the CPU context information stored in the context storage unit.

When the normal mode is changed to the power-saving mode, the main controller may change a clock speed and a network link speed for the power-saving mode and set the image forming apparatus to a power-saving mode service.

The first and second power domains may be included in a system-on-chip (SoC).

The context storage unit may be at least one of the first memory, the second memory, and a static random access memory (SRAM) and a register which are disposed separately from the first and second memories which are disposed in the second power domain.

Exemplary embodiments of the present general inventive concept may also provide a system-on-chip (SoC) unit which can be installed in an electronic device having first and second power domains which are separately supplied with power through different power supply lines, including first and second memories disposed in the second power domain, a main controller disposed in the first power domain and to perform a control operation using the first memory in a normal mode, a sub-controller disposed in the second power domain and to perform a control operation using the second memory in a power-saving mode, and a context storage unit to store context information, wherein a power supply to the first power domain is shut off when the normal mode is changed to the power-saving mode, the first memory operates in a self-refresh mode when the normal mode is changed to the power-saving mode, and the main controller copies lost central processing unit (CPU) context information, which is lost when shutting off the power supply to the first power domain, into the context storage unit when the normal mode is changed to the power-saving mode, and the main controller is booted using the CPU context information stored in the context storage unit when the power-saving mode is changed to the normal mode.

The context storage unit may be realized as at least one of the first memory, the second memory, and a SRAM and a register which are disposed separately from the first and second memories which are disposed in the second power domain.

Exemplary embodiments of the present general inventive concept may also provide a method of driving an image forming apparatus which is connected to a host device and the image forming apparatus includes first and second power domains which are separately supplied with power through different power supply lines, where the second power domain includes first and second memories, a sub-controller to perform a control operation using the second memory in a power-saving mode, and a context storage unit to store context information, and the first power domain includes a main controller to shut off a power supply thereto when the normal mode is changed to the power-saving mode and perform a control operation using the first memory in the normal mode, the method including changing the first memory to a self-refresh mode when the normal mode is changed to the power-saving mode and copying lost CPU context information, which is lost when shutting off a power supply to the first power domain, into the context storage unit; and booting the main controller using the CPU context information stored in the context storage unit when the power-saving mode is changed to the normal mode.

The method may further include supplying power to the first and second power domains, and when the normal mode is changed to the power-saving mode, controlling a power supply to shut off the power supplied to the first power domain.

The method may further include receiving image data from the outside with the image forming apparatus, processing the received image data, and performing an image forming job with the processed image data, where the first power domain further comprises a data processing module to process the image data and an engine module to perform the image forming job, and the second power domain further comprises a data receiving module to receive the image data The copying of the context information may include copying the CPU context information, which is lost when shutting off the power supply to the first power domain, and copying context information of elements of the first power domain into the context storage unit when the normal mode is changed to the power-saving mode.

The method may further include when a booting operation is performed, determining whether the booting operation is performed in the normal mode or whether the booting operation is a rebooting operation that is performed in the power-saving mode, where when the booting operation is the rebooting operation performed in the power-saving mode, the main controller is booted using the CPU context information stored in the context storage unit.

The main controller may change a clock speed and a network line speed for the power-saving mode and sets the image forming apparatus to a power-saving mode service when the normal mode is changed to the power-saving mode.

The first and second power domains may be included in a system-on-chip (SoC).

The context storage unit may be at least one of the first memory, the second memory, and a SRAM and a register which are, disposed separately from the first and second memories which are disposed in the second power domain.

Exemplary embodiments of the present general inventive concept may also provide a method of driving a SoC unit which is connected to a host device and includes first and second power domains which are separately supplied with power through different power supply lines, where the second power domain includes first and second memories, a sub-controller to perform a control operation using the second memory in a power-saving mode, and a context storage unit to store context information, and the first power domain includes a main controller to shut off a power supply thereto when a normal mode is changed to the power-saving mode and perform a control operation using the first memory in the normal mode, the method including when the normal mode is changed to the power-saving mode, changing the first memory to a self-refresh mode and coping CPU context information, which is lost when shutting off the power supply to the first power domain, into the context storage unit, and when the power-saving mode is changed to the normal mode, booting the main controller using the CPU context information stored in the context storage unit.

Exemplary embodiments of the present general inventive concept may also provide a storage medium having embodied thereon a program code to execute the method of driving the image forming apparatus.

As described above, according to exemplary embodiments of the present general inventive concept, a return time from a power-saving mode to a normal mode can be effectively shortened.

Exemplary embodiments of the present general inventive concept also provide a method of driving an image forming apparatus that operates in a normal mode and a power-saving mode, the method including changing a first memory of the image forming apparatus to a self-refresh mode when the normal mode is changed to the power-saving mode, copying processor context information of a processor into a context storage unit of the image forming apparatus, and booting a main controller of the image forming apparatus using the processor context information stored in the context storage unit when the power-saving mode is changed to the normal mode.

Exemplary embodiments of the present general inventive concept also provide a method of driving an image forming apparatus that operates in a normal mode and a power-saving mode, the method including copying processor context information of a processor into a context storage unit of the image forming apparatus, controlling a change from the normal mode to the power-saving mode with a first controller and a second controller so as to operate the image forming apparatus with reduced power from a power supply, changing a first memory of the image forming apparatus to a self-refresh mode when the when the normal mode is changed to the power-saving mode, and switching off power to a first power domain of the image forming apparatus that includes the first controller when the normal mode is changed to the power-saving mode.

The method may also include booting a main controller of the image forming apparatus using the processor context information stored in the context storage unit when the power-saving mode is changed to the normal mode.

Exemplary embodiments of the present general inventive concept also provide an image forming apparatus that operates in a normal mode and a power-saving mode, including a first memory having a self-refresh mode when the normal mode is changed to the power-saving mode, a context storage unit to store copied processor context information of a processor of the image forming apparatus, and a main controller that is booted with the processor context information stored in the context storage unit when the power-saving mode is changed to the normal mode.

Exemplary embodiments of the present general inventive concept also provide an image forming apparatus that operates in a normal mode and a power-saving mode, including a context storage unit to store copied processor context information of a processor of the image forming apparatus, a first controller and a second controller to control a change from the normal mode to the power-saving mode so as to operate the image forming apparatus with reduced power from a power supply, and a first memory having a self-refresh mode when the normal mode is changed to the power-saving mode, where the first controller switches off power to a first power domain of the image forming apparatus when the normal mode is changed to the power-saving mode.

BRIEF DESCRIPTION OF THE DRAWINGS

These and/or other embodiments and utilities of the present general inventive concept will become apparent and more readily appreciated from the following description of the embodiments, taken in conjunction with the accompanying drawings of which:

FIG. 3 is a flowchart illustrating a method of driving an image forming apparatus according to an exemplary embodiments of the present general inventive concept;

DETAILED DESCRIPTION OF THE EMBODIMENTS

Figure 1:
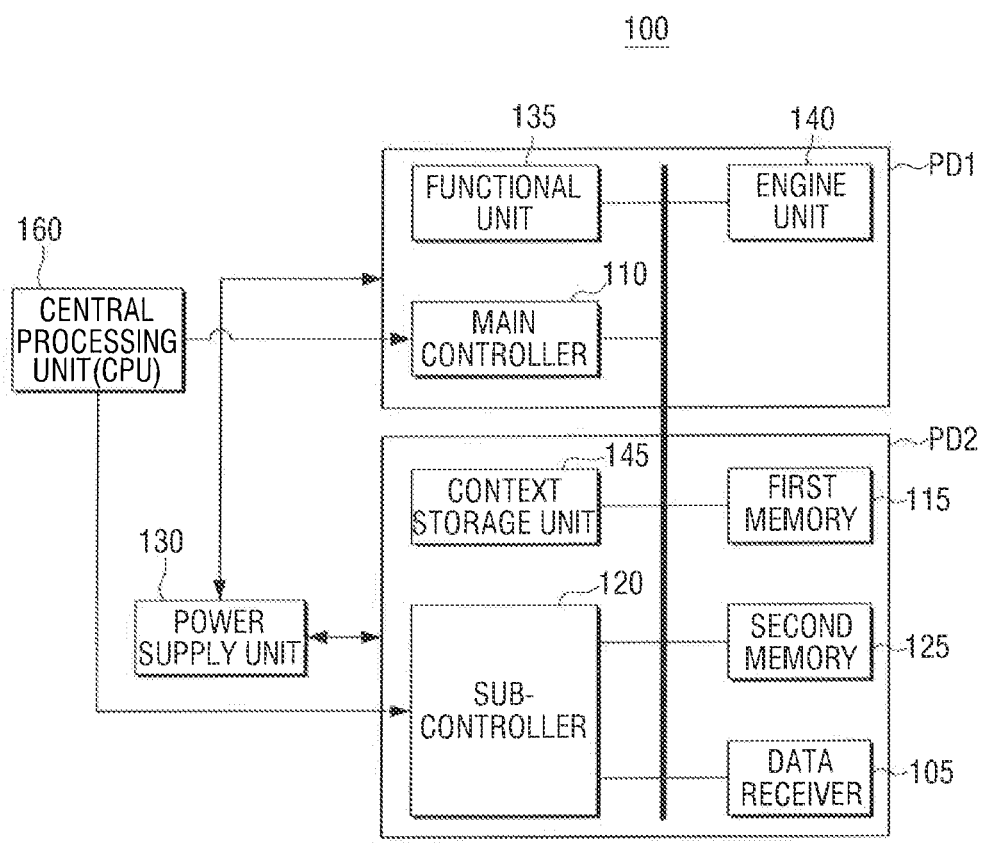
FIG. 1 is a block diagram illustrating an image forming apparatus according to exemplary embodiments of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1A:
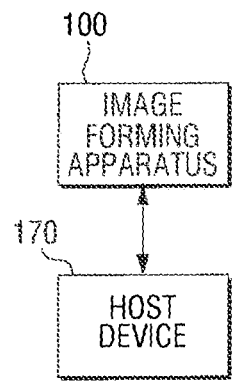
FIG. 1A illustrates an image forming apparatus communicatively coupled to a host device according to exemplary embodiments of the present general inventive concept.

FIG. 1 is a block diagram illustrating a structure of an image forming apparatus 100, and FIG. 1A illustrates the image forming apparatus 100 communicatively coupled to a host device 170 according to exemplary embodiments of the present general inventive concept.

Referring to FIG. 1, the image forming apparatus 100 can include a data receiver 105, a main controller 110, a first memory 115, a sub-controller 120, a second memory 125, a power supply unit 130, a functional unit 135, an engine unit 140, a context storage unit 145, and a central processing unit 160.

The image forming apparatus 100 may be a printer, a copier, a scanner, a facsimile machine, a multifunction peripheral (MFP) which includes combined functions of the printer, copier, and facsimile in one device, or the like. The central processing unit (CPU) 160 may be communicatively coupled to at least the main controller 110 and/or the sub-controller 120. The CPU 160 may be a processor, field programmable gate array, programmable logic device, an application specific integrated circuit, and/or any suitable processor to carry out the exemplary embodiments of the present general inventive concept. The CPU 160 may control, for example, copy, printing, scanning, and facsimile operations of the image forming apparatus 100.

The image forming apparatus 100 may include first and second power domains PD1 and PD2 which are separately supplied with power through different power supply lines. Here, a power domain refers to an area which is supplied with power through the same power supply line.

The second power domain PD2 can include the first and memories 115 and 125, the sub-controller 120, and the context storage unit 145, and the first power domain PD1 includes the main controller 110.

The first power domain PD1 can include the functional unit 135 and the engine unit 140, and the second power domain PD2 further includes the data receiver 105.

That is, the first power domain PD1 can include the main controller 110, the functional unit 135, and the engine unit 140 that are supplied by a first power supply line, and the second power domain PD2 can include the data receiver 105, first memory 115, the sub-controller 120, the second memory 125, and the context storage unit 145 are supplied by a second power supply line that is different from the first power supply line.

The data receiver 105 can perform a data communication with at least one external device. Here, the at least one external device may be a host device such as a personal computer or the like, or may be a user terminal device such as a cellular phone, a personal digital assistant (PDA), a universal serial bus (USB), or the like. The external device and/or host device may be the host device 170 as illustrated in FIG. 1A. The host device 170 may be communicatively coupled to the image forming apparatus via a wired and/or wireless communications link.

The main controller 110 can control the operation of the image forming apparatus 100, and, in particular, can perform a control operation in a normal mode using the first memory 115, which will be described later. The main controller 110 may receive operation instructions and/or commands from the central processing unit (CPU) 160. For example, the CPU 160 may provide the main controller 110 with a request signal for an image forming job. When a request signal for an image forming job is input in a power-saving mode, the main controller 110 changes the power-saving mode to the normal mode to activate the first memory 115 and perform a corresponding operation using the activated first memory 115. That is, when a request signal for an image forming job is received when the image forming apparatus 100 and/or the main controller 110 is in a power-saving mode, the main controller 110 can change the power-saving mode to the normal mode and perform the operation as requested by the received signal.

In particular, when the normal mode is changed to the power-saving mode, the main controller 110 can copy context information (e.g., data and/or state information of the main controller 110 that may otherwise be lost when power is no longer supplied to the main controller 110) into the context storage unit 145. When the power-saving mode is changed to the normal mode, the main controller 110 can be booted using the context information stored in the context storage unit 145. Here, the context information may be central processing unit (CPU) context information (e.g., the context information of CPU 160) which may be lost when a power supply to the first power domain PD is shut off. The context information may also include context information of other elements (e.g., the context information of the main controller 110, the sub-controller 120, the functional unit 135, etc.) which is lost when the power supply to the first power domain PD1 is shut off.

The sub-controller 120 can perform a control operation using the second memory 125 in the power-saving mode.

In more detail, the sub-controller 120 can perform an operation according to a preset signal using the second memory 125 when maintaining the power-saving mode. The preset signal may be a state request signal of an image forming apparatus which is input through an application of a host device (e.g., host device 170 illustrated in FIG. 1A) in a maintainable state of a power-saving mode. For example, the preset signal may be a signal which is input and/or received through a smart panel of the host device 170. Here, the smart panel may a panel of the host device 170 which displays a state of the image forming apparatus, e.g., may periodically check the state of the image forming apparatus through a USB control communication. A user may check a printing state, a paper state, a toner state, a power on/off state of the image forming apparatus through the smart panel in the host device 170. That is, the smart panel of the host device 170 may be a touch screen display to receive one or more selections, and to display the state of the image forming apparatus (e.g., the printing state, the paper state, the toner state, the power on/off state, etc.).

Here, the normal mode refers to a mode in which the image forming apparatus 100 performs a normal operation (e.g., a print operation, a copy operation, a scanning operation, etc.), and the power-saving mode refers to an operation mode which is to shut off or minimize power supplied to most modules in order to minimize power consumed when a system (or the image forming apparatus 100) does not perform any operation.

A predetermined low wait power (less than or equal to 1 W) may be provided in a power-saving mode according to exemplary embodiments of the present general inventive concept. A main memory (in general, an external dynamic random access memory (DRAM)) may be set to a self-refresh mode, and a program may be driven in an unused internal memory of a system-on-chip (SoC). For example, a static random access memory (SRAM) may use a small capacity memory of about 128 KB. However, a synchronous DRAM (SDRAM) may be used or a read only memory (ROM) may be used together with a SRAM or SDRAM.

The first memory 115 may be a main memory used in an operation of the normal mode. In exemplary embodiments of the present general inventive concept, the first memory 115 may be a non-volatile memory. For example, a dynamic RAM (DRAM) or the like may correspond to the non-volatile memory.

The first memory 115 can be maintained in a self-refresh mode when the normal mode is changed to the power-saving mode. That is, power may be applied to the first memory 115 in the power-saving mode as to refresh the memory (i.e., maintain the data stored in the first memory 115).

The second memory 125 can be used in an operation of the power-saving mode, which is driven at a predetermined low power, rather than in the normal mode. For example, a program to control the power-saving mode may determine whether a signal has been input to the data receiver 105, may perform an operation according to a received USB control signal, and may perform a wake-up operation to change the power-saving mode to the normal mode.

The second memory 125 can store a program, an application, and the like which can support the power-saving mode. The second memory 125 can beat least one of a SRAM and a SDRAM. Alternatively, the second memory 125 may be a RDRAM (Rambus Dynamic Random Access Memory), a DRAM, a double data rate-SDRAM (DDR-SDRAM), or the like.

In exemplary embodiments of the present general inventive concept, at least one of a ROM and a flash memory may be used to store controller-executable codes for a power-saving mode (e.g., codes that are executable by the main controller 110 and/or the sub-controller 120).

According to exemplary embodiments of the present general inventive concept, the second memory 125 may be a SRAM. In this case, the SRAM may be used to copy and execute codes which are stored in a DRAM, a ROM, or a flash memory to operate the power-saving mode.

Alternatively, the second memory 125 may be a SRAM and may execute codes which are stored in a ROM, a flash memory, or the like to operate the power-saving mode.

The second memory 125 may a SDRAM and may be used to execute codes which are stored in a ROM, a flash memory, or the like to operate the power-saving mode.

The second memory 125 may be used together with the first memory 115 in the operation of the normal mode. In other words, a SRAM that may operate as a buffer when an image is processed in the normal mode may be re-used as the second memory 125 in the power-saving mode.

The main controller 110 can change the first memory 115 to the self-refresh mode when the main controller 110 changes the normal mode to the power-saving mode.

Hereinafter, characteristics of each memory will be described in brief for understanding of the present general inventive concept.

A SRAM can maintain data thereof when power is being supplied thereto. The SRAM can maintain the data thereof through one-time writing (e.g., maintain the data without a periodical re-writing operation). The SRAM can be a small capacity memory and has a very fast and/or increased operation speed but is generally more expensive than a DRAM. Therefore, the SRAM can be used in an apparatus for a memory having a predetermined fast speed and a predetermined small capacity like a cache memory.

Differently from the SRAM, the DRAM may be continuously re-written in one or more operations to maintain data thereof. Therefore, the DRAM is typically has a larger capacity memory than the SRAM, but may be relatively slower than the SRAM. Dram may be used as a main memory in most systems.

A SDRAM may synchronously operate by synchronizing with a system clock (e.g., a system clock of the image forming apparatus 100). Since the SDRAM may operate depending on the system clock, (e.g., operate at a typical system bus speed of 200 MHz), the SDRAM can increase a system speed (e.g., can increase in speed as the clock speed increases).

The power supply unit 130 can supply power to the image forming apparatus 100.

In more detail, the power supply unit 130 can supply power to the first and second power domains PD1 and PD2 in the normal mode. In the power-saving mode, the power supply unit 130 can shut off a power supply to the first power domain PD1 but can supply power to the second power domain PD2. That is, in the power-saving mode, the power supply unit 130 can supply power to the second power domain PD2, but may not supply power to the first power domain PD1.

In exemplary embodiments of the present general inventive concept, the main controller 110 and the sub-controller 120 can control the image forming apparatus 100. As described above, the main controller 110 and/or the sub-controller may receive one or more printing operation commands, scanning operation commands, and copying operation commands from the CPU 160. Alternatively, first and second CPUs (not illustrated) may respectively transmit commands to first and second controllers (not illustrated) so that elements of the image forming apparatus 100 perform corresponding operations. The commands generated by the first and second CPUs and/or the first and second controllers may be received by the main controller 110 and/or the sub-controller 120. The main controller 110 and/or the sub-controller 120 may control, for example, the engine unit 140 to perform an image forming job according to the commands received from the first and second CPUs and/or the first and second controllers.

The image forming apparatus 100 according to exemplary embodiments of the present general inventive concept may include a phase-locked loop (PLL) unit to generate one or more different operating frequencies (e.g., so as to carry out one or more image forming jobs, such as copying, scanning, and printing). The PLL unit may provide the generated operating frequencies to the main controller 110, the sub-controller 120, the first memory 115, and the second memory 125.

The functional unit 135 can perform one or more functions, such as a function of processing an image, a function of compressing the image, and a function of decompressing the image, which are to be processed so that the engine unit 140 performs image forming jobs such as printing, copying, scanning jobs, etc.

An operation module (not illustrated) may include one or more functional modules which may not included in the functional unit 135 because of a predetermined capacity of the functional unit 135. The operation module may include at least one or more functional modules, each of which may be a single chip.

If the main controller 110 satisfies preset conditions, the main controller 110 may change the normal mode to the power-saving mode. For example, a preset condition may be to change from the normal mode to the power-saving mode after a preset amount of time has elapsed without the main controller 110 receiving a command. However, this is only an example, but various cases may exist in a mode change event.

When the normal mode is to be changed to the power-saving mode as described above, the main controller 110 may copy a program to control the power-saving mode from the first memory 115 into an executable area of the second memory 125, or may copy a program stored in a ROM, a flash memory, or the like into the executable area of the second memory 125. Therefore, the main controller 110 can have a smaller capacity than a USB program which is used in the normal mode and stored in the first memory 115. When the codes are completely copied, the main controller 110 can shut off the power supply to the first power domain PD1 and may operate in the power-saving mode.

Codes may be copied that are stored in a flash memory or a ROM into a DRAM during booting, and/or codes may be copies into a SRAM when entering the power-saving mode.

When the operating state of the sub-controller 120 satisfies one or more preset conditions, the sub-controller 120 can change the power-saving mode to the normal mode. For example, when an event such as a panel key input, a printing service request, a fax ring, or the like is received by the image forming apparatus 100, the sub-controller 120 may change the power-saving mode to the normal mode.

The main controller 110, the function unit 135, the engine unit 140, the data receiver 105, the first memory 115, the sub-controller 120, and the second memory 125 may be integrated into a single chip such as an application-specific integrated circuit (ASIC) chip, a field programmable gate array, and/or a programmable logic device so as to be a SoC.

In general, a booting time (which may include an initialization of a DRAM (not illustrated) in a booting process, copying of codes from a ROM to the DRAM, initializing one or more components of the image forming apparatus 100, booting of an operating system (OS), a start of a service program, etc.) when a power-saving mode returns to a normal mode may be equal to an initial booting time. The power of a main controller (not illustrated) and a DRAM (not illustrated) may be turned off when power to the first power domain (e.g., including the main controller and the DRAM) is turned off. When power is turned on so as to power the main controller and the DRAM, the booting may be the same process as the initial booting process when applying power as described above.

However, according to exemplary embodiments of the present general inventive concept, the first memory 115 used in the normal mode can be disposed in the second power domain PD2 which is separately supplied with power through a different power supply line from that through which the first power domain PD1 is supplied with power. Therefore, the normal mode can be changed to the self-refresh mode by maintaining power of the first memory 115 without shutting off the power of the first memory 115 so as to maintain contents of the first memory 115. Accordingly, although power of the DRAM is not switched off, power between 1 W and 2 W may be lowered to 200 mW or less in order to achieve a predetermined low power.

Although data stored in the first memory 115 is maintained, power of the first power domain PD1 is switched off. That is, power can be re-applied to the first power domain PD1 after the power of the first domain PD1 is switched off. Therefore, performance contexts and/or operation state information of the main controller 110 may be lost. For example, if the main controller 110 is an asynchronous response mode (ARM), the performance contexts and/or operation state information may include a register set, a state register, set values of information provider (IP) blocks of the SoC, and the like. An ARM CPU typically has a similar clock to a CPU of a desktop PC but consumes power between about 40 mW and 450 mW.

According to the image forming apparatus 100 of FIG. 1, when changing from the normal mode to the power-saving mode, the main controller 110 can store performance context information of the main controller 110, the functional unit 135, the engine unit 140, and the like, which are typically lost when shutting off the power supply to the first power domain PD1, into the context storage unit 145 of the second power domain PD2. As the image forming apparatus 100 returns to a state before the normal mode is changed to the power-saving mode by using contexts stored in the context storage unit 145 during rebooting, the image forming apparatus 100 can be rebooted at an increased rate.

The context storage unit 145 may be an additional register, a SRAM, or the like which is disposed in the second power domain PD2. Alternatively, the context storage unit 145 may be the first memory 125. In other words, the first memory 115 can be changed to the self-refresh mode, and CPU contexts can be stored in the context storage unit 145, thereby maintaining information to return to a previous mode.

Figure 2A:
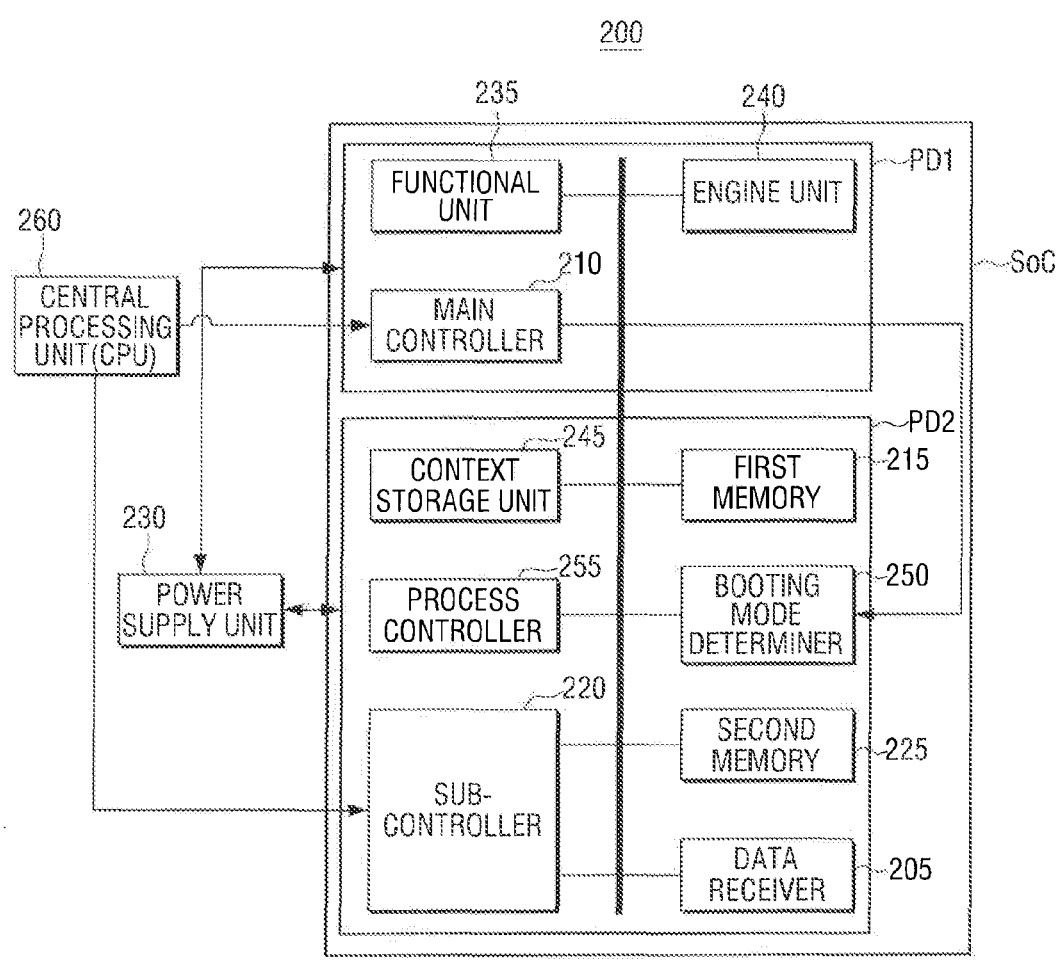
FIG. 2A is a block diagram illustrating a structure of an image forming apparatus according to exemplary embodiments of the present general inventive concept.

FIG. 2A is a block diagram illustrating a structure of an image forming apparatus 200 according to exemplary embodiments of the present general inventive concept.

Referring to FIG. 2A, the image forming apparatus 200 can include a data receiver 205, a main controller 210, a first memory 215, a sub-controller 220, a second memory 225, a power supply unit 230, a functional unit 235, an engine unit 240, a context storage unit 245, a booting mode determiner 250, a process controller 255, and a central processing unit (CPU) 260.

In other words, the image forming apparatus 200 of FIG. 2A can include the booting mode determiner 250 and the process controller 255 which may be different from the image forming apparatus 100 of FIG. 1. For convenience, detailed descriptions of the same elements of FIG. 2A as those of FIG. 1 will be omitted.

When booting is performed, the booting mode determiner 250 can determine whether the booting is performed in a normal mode or is rebooting performed in a power-saving mode.

When the booting mode determiner 250 can determine that the booting is the re-booting performed in the power-saving mode, the main controller 210 can recover a CPU operation mode register and a state register from the context storage unit 245 and can return to a last performance point so as to boot within a time of several ms (e.g., 2 ms, 4 ms, 6 ms, 10 ms, etc.).

The booting mode determiner 250 may store a booting mode using a register and determine the booting mode through an input of an external general purpose input/output (GPIO) pin or the like. That is, the booting mode determiner 250 may receive an input, and may determine a booting mode according to the received input.

Therefore, a reset vector (e.g., a predetermined location in the first memory 115 and/or the second memory 125, or any other suitable memory, that the main controller 210 may go to find the first instruction to be executed after a reset) can be re-performed in the main controller 210 to minimize and/or prevent the booting from being performed equal to a system power applying booting process.

When the booting is performed in the power-saving when the power-saving mode is changed to the normal mode, the first memory 215 may exit a self-refresh mode. Therefore, the main controller 210 may terminate the self-refresh mode of the first memory 215 when the main controller 210 is booted or the sub-controller 220 may terminate the self-refresh mode of the first memory 215.

The process controller 255 can perform a control of the sub-controller 220 when entering the power-saving mode.

In more detail, when the normal mode is changed to the power-saving mode, the process controller 255 can change the first memory 115 to the self-refresh mode and can shut off a power supply to a first power domain PD1.

The process controller 255 can perform booting control of the main controller 210 and the sub-controller 220.

In the exemplary embodiments of the present general inventive concept illustrated in FIG. 2A, the data receiver 205, the main controller 210, the first memory 215, the sub-controller 220, the second memory 225, the power supply unit 230, the functional unit 235, the engine unit 240, the context storage unit 245, the booting mode determiner 250, and the process controller 255 may be a SoC.

Figure 2B:
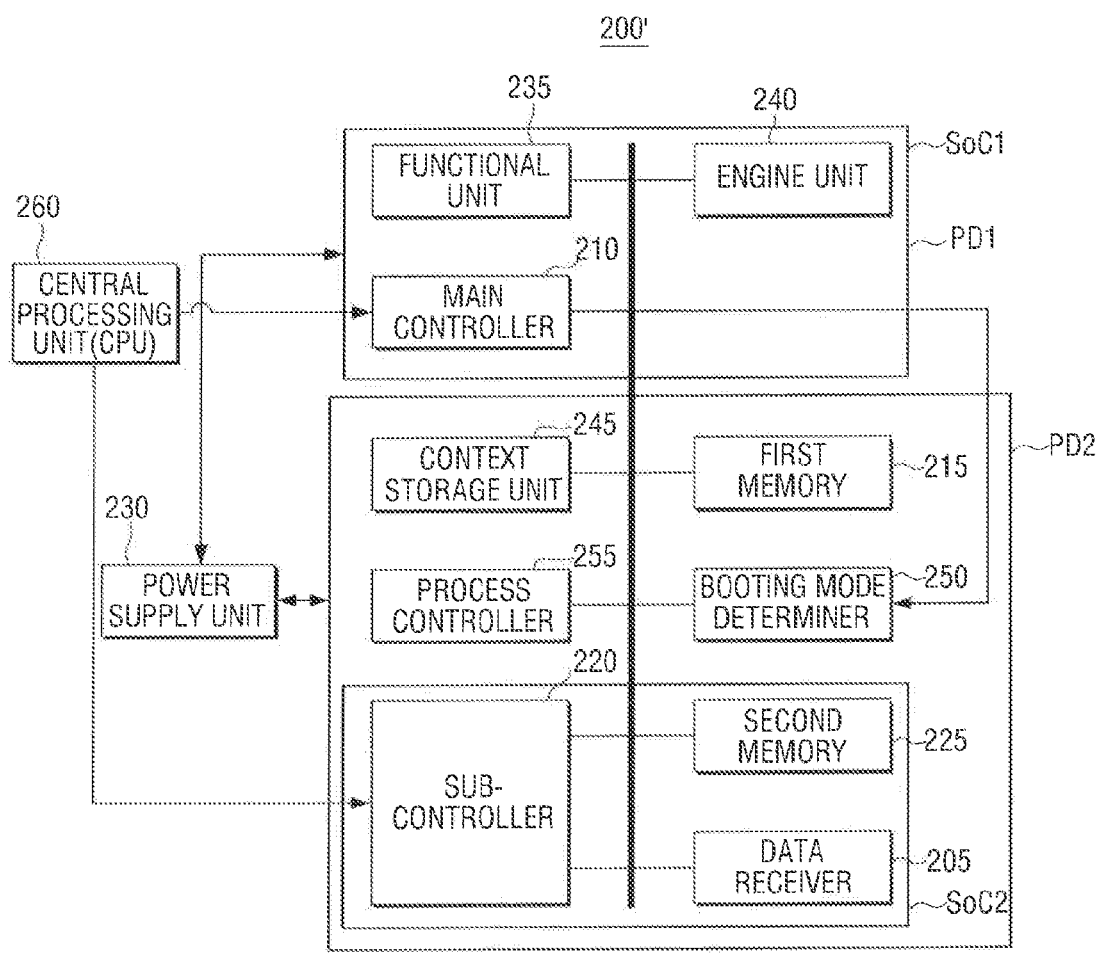
FIG. 2B is a block diagram illustrating a structure of an image forming apparatus according to exemplary embodiments of the present general inventive concept.

FIG. 2B is a block diagram illustrating a structure of an image forming apparatus 200' according to exemplary embodiments of the present general inventive concept.

Referring to FIG. 2B, the image forming apparatus 200' can include a first SoC SoC1 which includes a main controller 210, a functional unit 235, and an engine unit 240 and a second SoC SoC2 which includes a data receiver 205, a sub-controller 220, and a second memory 225. The image forming apparatus 200' can also include a central processing unit (CPU) 260 that is communicatively coupled to at least the main controller 210 and/or the sub-controller 220.

A first memory 215, a process controller 255, a context storage unit 245, and a booting mode determiner 250 can be disposed outside the first and second SoCs SoC1 and SoC2.

In exemplary embodiments of the present general inventive concept, when the normal mode is changed to the power-saving mode, the sub-controller 220 can be reset, can store a micro-firmware for a power-saving mode service in the second memory 225, and can operate in a power-saving mode.

According to exemplary embodiments of the present general inventive concept, a SoC unit which can be installed in an electronic device may include first and second power domains which are separately supplied with power through different power supply lines. The second domain may include first and second memories, a sub-controller which performs a control operation using the second memory in a power-saving mode, and a context storage unit which stores context information. The first power domain may include a main controller which performs a control operation using the first memory in a normal mode, copies the context information into the context storage unit when the normal mode is changed to the power-saving mode, and can be booted using the context information stored in the context storage unit when the power-saving mode is changed to the normal mode.

The image forming apparatuses 100, 200, 200' of FIGS. 1, 2A, and 2B with a host device (e.g., host device 170 illustrated in FIG. 1A) will now be described in brief.

The host device (e.g., host device 170 illustrated in FIG. 1A) may be a PC, a PDA, a portable multimedia player (PMP), a TV, a server, etc.

The host device can include an application (not illustrated) and a host controller (not illustrated).

The application may be software which supports one or more data communications in an operating system (OS).

The host controller may include software and/or hardware such that the image forming apparatuses 100, 200, and 200' can be combined with the host device.

The host device may include a printer driver (not illustrated) which converts printing data written in and/or generated by the application into a printer language which can be interpreted by the image forming apparatuses 100, 200, and 200'. Here, the printer driver may be included in the host controller. The host device may include an input unit (not illustrated), a display unit (not illustrated), and the like.

Elements of FIGS. 1, 2A, and 2B and their disposition orders, selection, and/or arrangements are exemplary embodiments of the present general inventive concept, and thus one or more of the elements may be removed and/or another element may be added and the disposition orders may be changed.

FIG. 3 is a flowchart illustrating a method of driving an image forming apparatus according to exemplary embodiments of the present general inventive concept.

Referring to FIG. 3, when preset conditions are satisfied at operation S310, a main controller can prepare an entry into a power-saving mode at operation S320. Here, the preset conditions may refer to a performance state of an image forming job such as printing and/or scanning, and a state after a predetermined pause time or more elapses when the image forming job is completely performed.

An operation of preparing the entry into the power-saving mode can be an operation of a sub-controller to install microcodes to perform a power-saving mode service in a power-saving mode service memory, stop interrupt controller backup and service, and perform various pre-jobs to change a normal mode to the power-saving mode such as a stoppage of a main timer or the like.

If the operation of entering into the power-saving mode is completely performed at operation S320, the main controller backs up performance context information thereof in a context storage unit at operation S330. In this case, since cache information of the main controller can be lost when power is switched on, the cache information may be reflected on a DRAM through a cache flush.

The main controller can request a change from the normal mode to the power-saving mode from the sub-controller at operation S340. In other words, the main controller can inform the sub-controller of a start of a power-saving mode service and can wait until power thereof is switched off.

The sub-controller can start the power-saving mode service under the control of the main controller at operation S350. In this case, the sub-controller may change a clock speed and a network link speed for the power-saving mode and set the image forming apparatus to a predetermined low power service of the power-saving mode service.

The sub-controller can change the DRAM to a self-refresh mode to operate at wait power of 1 W or less at operation S360. This may be performed by the sub-controller but may be performed by the main controller using cache locking or a SRAM (e.g., a space which is not a DRAM).

Before going into the power-saving mode service, power of a first power domain can be switched off to start the power-saving mode service at a wait power of 1 W or less at operation S370. When the image forming apparatus goes into this state, only a minimum number of blocks belonging to a second power domain, such as a data receiver, a context storage unit, and the like, consume power so as to provide a low power mode.

Figure 4:
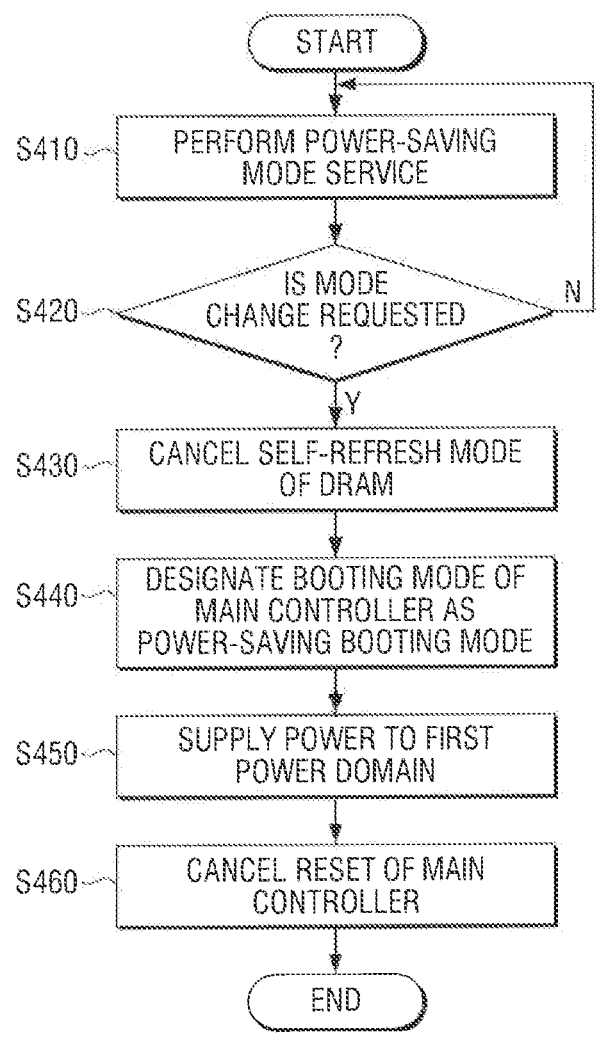
FIG. 4 is a flowchart illustrating a method of changing an image forming apparatus from a normal mode to a power-saving mode according to exemplary embodiments of the present general inventive concept.

FIG. 4 is a block diagram illustrating a method of changing an image forming apparatus from a normal mode to a power-saving mode according to exemplary embodiments of the present general inventive concept.

Referring to FIG. 4, a power-saving mode service can be performed at operation S410. A determination can be made as to whether a mode change has been requested at operation S420. When it is determined that the mode change has been requested at operation S420-Y, i.e., a request for an image forming job service is received, a sub-controller can return to an image forming service mode (e.g., that may be part of a normal operation mode).

The sub-controller can cancel a self-refresh mode of a DRAM at operation S430.

The sub-controller can designate a booting mode of a main controller as a power-saving booting mode so that the main controller determines that the booting mode is the power-saving booting mode, not a normal booting mode during a return to the power-saving booting mode at operation S440. The designation of the booting mode may be set during returning or during a process of going into a power-saving mode.

Power can be supplied to a first power domain at operation S450. In other words, the power can be applied to the first power domain to boot the main controller.

A reset of the main controller can be canceled at operation S460. This may be performed through the process controller 255 illustrated in FIGS. 2A-2B.

Therefore, the main controller can perform booting. Operations S450 and S460 may be integrated into one operation in a system in which a reset of a main controller can be automatically cancelled when applying power.

Figure 5:
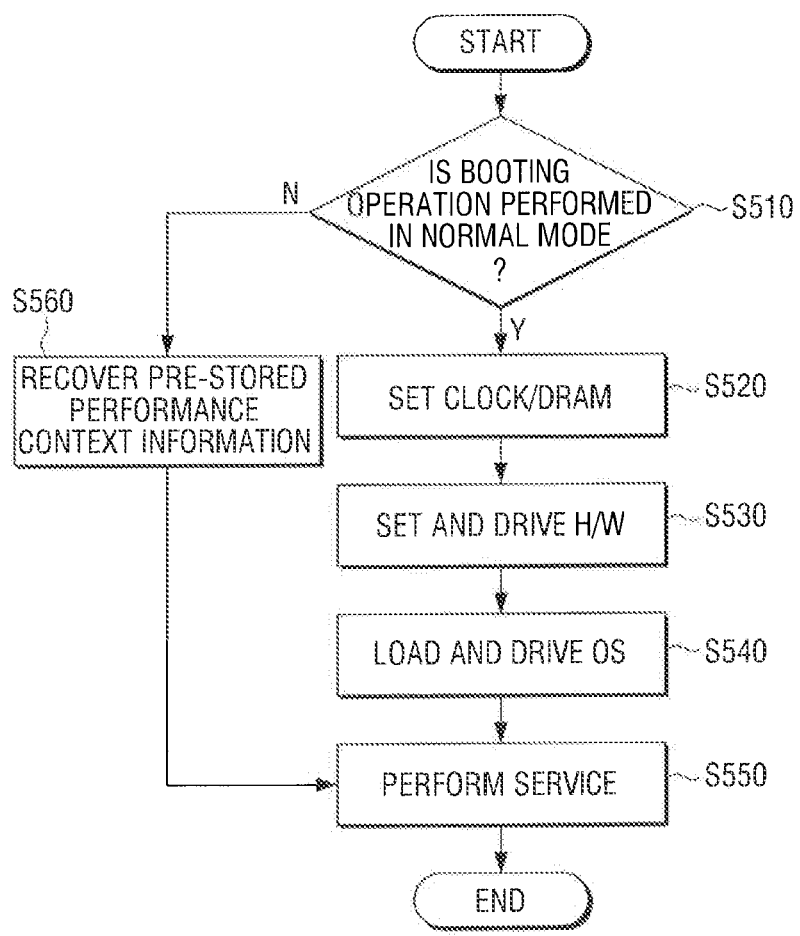
FIG. 5 is a flowchart illustrating a method of booting an image forming apparatus according to exemplary embodiments of the present general inventive concept.

FIG. 5 is a flowchart illustrating a method of booting an image forming apparatus according to exemplary embodiments of the present general inventive concept.

Referring to FIG. 5, a determination can be made as to whether booting is performed in a normal mode or is rebooting performed in a power-saving mode at operation S510.

When it is determined that the booting is performed in the normal mode at operation S510-Y, a clock/DRAM can be set at operation S520, one or more hardware components of the image forming apparatus can be set and driven at operation S530, and an OS can be loaded and driven at operation S540. A normal mode service can be performed at operation S550.

When it is determined that the booting is the rebooting performed in the power-saving mode at operation S510-N, context information stored in a context storage unit can be recovered to perform the booting. Therefore, a register of each mode may be recovered, and a PC value may be moved to a previous performance point, thereby returning to a service performance state before going into a low power mode.

In other words, a DRAM can be in a self-refresh mode (e.g., not in a power-off mode), and thus may exit out of the self-refresh mode. In this case, a main controller may approach the DRAM, and all types of information generated before going into the low power mode may be stored in the DRAM. However, CPU contexts, i.e., register information and status register information may be lost, and thus may not be immediately recovered. Information stored in a context storage unit may be recovered to perform booting.

Here, the context information may include CPU contexts and CPU cores which can be lost when switching off power and a minimum number of registers (e.g., registers of memory in a CPU). As the DRAM may be in the self-refresh mode, the context information may be stored in an area of a SRAM or a DRAM of a SoC to perform storage and recover at a time (e.g., where the recovery time may be hundreds of microseconds (e.g., 500 μs, 400 μs, 300 μs, 200 μs, etc.) or less (e.g., 50 μs, 20 μs, 10 μs, etc.)).

According to the present general inventive concept as described above, a recovery time of an image forming apparatus may be effectively shortened and/or decreased when the image forming apparatus returns from a power-saving mode to a normal mode. For example, a recovery time from dozens of seconds to several minutes may be shortened to within a range of several ms.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Exemplary embodiments of the present general inventive concept may be applied to various communication ways, e.g., a network communication, a USB, Bluetooth, high definition multimedia interface (HDMI), peripheral component interconnect (PCI) express, Ethernet, ZigBee, Firewire, CAN, ZigBee, IEEE 1394, PS/2, accelerated graphics port (AGP), industry standard architecture (ISA), video electronics standard architecture (VESA), or the like.

In the above-described exemplary embodiments, an image forming apparatus has been exemplarily described, but this is only an example, and thus the same principle and structure may be applied to other electronic devices to which the spirit of the present general inventive concept may be applied.

Although several example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. An image forming apparatus which is connected to a host device having first and second power domains which are separately supplied with power through different power supply lines, comprising:
an engine unit configured to perform an image forming job;
first and second memories disposed in the second power domain;
a main controller disposed in the first power domain to perform a control operation using the first memory in a normal mode;
a sub-controller disposed in the second power domain to perform a control operation using the second memory in a power-saving mode;
a context storage unit to store context information; and
when a booting operation is performed, a booting mode determiner to determine whether the booting operation is performed in the normal mode or whether a re-booting operation is performed in the power-saving mode,
wherein when the booting operation is the re-booting operation performed in the power-saving mode, the main controller is booted using the CPU context information stored in the context storage unit,
wherein a power supply to the first power domain is shut off when the normal mode is changed to the power-saving mode, the first memory operates in a self-refresh mode when the normal mode is changed to the power-saving mode, and the main controller copies central processing unit (CPU) context information, which is lost when shutting off the power supply to the first power domain, into the context storage unit when the normal mode is changed to the power-saving mode, and the main controller is booted using the CPU context information stored in the context storage unit when the power-saving mode is changed to the normal mode,
wherein the first power domain and the second power domain are separately supplied with power through the different power supply lines from the same power supply unit, and
wherein the sub-controller perform an operation according to a preset signal using the second memory when maintaining the power-saving mode, and the preset signal is a state request signal of the image forming apparatus.

2. The image forming apparatus as claimed in claim 1, further comprising:
a process controller to control the power supply unit to shut off the power supply to the first power domain when the normal mode is changed to the power-saving mode.

3. The image forming apparatus as claimed in claim 1, further comprising:
a data receiver to receive image data from the outside;
a data processor to process the received image data; and
an engine unit to perform an image forming job with the processed image data,
wherein the engine unit and the data processor are disposed in the first power domain, and the data receiver is disposed in the second power domain.

4. The image forming apparatus as claimed in claim 1, wherein when the normal mode is changed to the power-saving mode, the main controller copies CPU context information, which is lost when shutting off the power supply to the first power domain, and context information of elements of the first power domain into the context storage unit.

5. The image forming apparatus as claimed in claim 1, wherein when the normal mode is changed to the power-saving mode, the main controller changes a clock speed and a network link speed for the power-saving mode and sets the image forming apparatus to a power-saving mode service.

6. The image forming apparatus as claimed in claim 1, wherein the context storage unit is at least one of the first memory, the second memory, and a static random access memory (SRAM) and a register which are disposed separately from the first and second memories which are disposed in the second power domain.

7. The image forming apparatus as claimed in claim 1, wherein the first and second power domains are comprised in a system-on-chip (SoC).

8. A system-on-chip (SoC) unit to be installed in an electronic device having first and second power domains which are separately supplied with power through different power supply lines and having an engine unit configured to perform an image forming job, comprising:
first and second memories disposed in the second power domain;
a main controller disposed in the first power domain to perform a control operation using the first memory in a normal mode;
a sub-controller disposed in the second power domain to perform a control operation using the second memory in a power-saving mode;

a context storage unit to store context information; and when a booting operation is performed, a booting mode determiner to determine whether the booting operation is performed in the normal mode or whether a re-booting operation is performed in the power-saving mode, wherein when the booting operation is the re-booting operation performed in the power-saving mode, the main controller is booted using the CPU context information stored in the context storage unit, wherein a power supply to the first power domain is shut off when the normal mode is changed to the power-saving mode, the first memory operates in a self-refresh mode when the normal mode is changed to the power-saving mode, and the main controller copies lost central processing unit (CPU) context information, which is lost when shutting off the power supply to the first power domain, into the context storage unit when the normal mode is changed to the power-saving mode, and the main controller is booted using the CPU context information stored in the context storage unit when the power-saving mode is changed to the normal mode, wherein the first power domain and the second power domain are separately supplied with power through the different power supply lines from the same power supply unit, and wherein the sub-controller perform an operation according to a preset signal using the second memory when maintaining the power-saving mode, and the preset signal is a state request signal of the electronic device.

9. The SoC unit as claimed in claim 8, wherein the context storage unit is at least one of the first memory, the second memory, and a SRAM and a register which are disposed separately from the first and second memories which are disposed in the second power domain.

10. A method of driving an image forming apparatus which is connected to a host device and the image forming apparatus has an engine unit configured to perform an image forming job, first and second power domains which are separately supplied with power through different power supply lines, where the second power domain comprises first and second memories, a sub-controller to perform a control operation using the second memory in a power-saving mode, and a context storage unit to store context information, and the first power domain comprises a main controller to shut off a power supply thereto when the normal mode is changed to the power-saving mode and perform a control operation using the first memory in the normal mode, the method comprising:

separately supplying power to the first power domain and the second power domain with power through the different power supply lines from the same power supply unit;

changing the first memory to a self-refresh mode when the normal mode is changed to the power-saving mode and copying lost central processing unit (CPU) context information, which is lost when shutting off a power supply to the first power domain, into the context storage unit;

booting the main controller using the CPU context information stored in the context storage unit when the power-saving mode is changed to the normal mode; and when a booting operation is performed, determining whether the booting operation is performed in the normal mode or whether the booting operation is a rebooting operation that is performed in the power-saving mode, wherein when the booting operation is the rebooting operation performed in the power-saving mode, the main controller is booted using the CPU context information stored in the context storage unit, and wherein when receiving a state request signal of the image forming apparatus from the host device, the sub-controller perform an operation according to the state request signal using the second memory when maintaining the power-saving mode.

11. The method as claimed in claim 10, further comprising:

when the normal mode is changed to the power-saving mode, controlling a power supply to shut off the power supplied to the first power domain.

12. The method as claimed in claim 10, further comprising:

receiving image data with the image forming apparatus;

processing the received image data; and performing an image forming job with the processed image data, wherein the first power domain further comprises a data processing module to process the image data and an engine module to perform the image forming job, and the second power domain further comprises a data receiving module to receive the image data.

13. The method as claimed in claim 10, wherein the copying of the context information includes copying the CPU context information, which is lost when shutting off the power supply to the first power domain, and copying context information of elements of the first power domain into the context storage unit when the normal mode is changed to the power-saving mode.

14. The method as claimed in claim 10, wherein the main controller changes a clock speed and a network line speed for the power-saving mode and sets the image forming apparatus to a power-saving mode service when the normal mode is changed to the power-saving mode.

15. The method as claimed in claim 10, wherein the first and second power domains are comprised in a system-on-chip (SoC).

16. The method as claimed in claim 10, wherein the context storage unit is at least one of the first memory, the second memory, and a SRAM and a register which are disposed separately from the first and second memories which are disposed in the second power domain.

17. The SoC unit as claimed in claim 8, wherein when the normal mode is changed to the power-saving mode, the main controller changes a clock speed and a network link speed for the power-saving mode and sets the image forming apparatus to a power-saving mode service.

18. The SoC unit as claimed in claim 8, wherein the context storage unit is at least one of the first memory, the second memory, and a SRAM and a register which are disposed separately from the first and second memories which are disposed in the second power domain.

* * * * *